United States Patent [19]
Shaffer

[11] 3,832,120
[45] Aug. 27, 1974

[54] INTERNAL DECKLE STRUCTURE

[75] Inventor: Ronald L. Shaffer, Downingtown, Pa.

[73] Assignee: Beloit Corporation, Beloit, Wis.

[22] Filed: Oct. 19, 1972

[21] Appl. No.: 299,043

[52] U.S. Cl. ............................. 425/466, 425/381
[51] Int. Cl. ............................................. B29d 7/04
[58] Field of Search .................... 425/381, 466, 467

[56] References Cited
UNITED STATES PATENTS
3,711,235   1/1973   Bunte ............................. 425/466

Primary Examiner—R. Spencer Annear
Assistant Examiner—Mark Rosenbaum
Attorney, Agent, or Firm—Hill, Gross, Simpson, Van Santen, Steadman, Chiara & Simpson

[57] ABSTRACT

Internal deckle structure for extruder dies for plastic film. The deckle structure includes a primary deckle placed in the pre-land area of the die to disrupt the edge of the molten plastic material and minimize edge bead and to serve as a seal for the melt flow passageway. A second deckle is placed in the transition area of the die between the pre-land area and the final land area defining the discharge orifice of the die. The deckles may be horizontally adjusted along the pre-land area of the die dependent upon the width of the film extruded either independently of each other or together to provide a most effective arrangement for sealing and necking down the plastic film as it leaves the die. A clamp and screw structure is provided for adjustably moving the deckles in and out along the die and conical split locking nuts are provided for locking the deckles in fixed relation with respect to each other and with respect to the die, where required.

10 Claims, 2 Drawing Figures

PATENTED AUG 27 1974

3,832,120

INTERNAL DECKLE STRUCTURE

PRIOR ART, BACKGROUND AND ADVANTAGES OF THE INVENTION

Film extrusion dies having adjustable deckles defining the width of the film are shown in the U.S. Pats. to Chiselko et al. No. 3,293,639; Hoffman, No. 3,238,563; Groleau, No. 2,982,995 and in an application of George J. Marion Ser. No. 223,436, filed as a continuation-in-part of application Ser. No. 861,047 and assigned to the assignee of the present invention. A further film extrusion die having an external boat deckle and a single internal deckle at each end of the die is disclosed in the May 1971 issue of "Modern Converter."

The foregoing prior art references do not have the advantage of sealing the melt flow passageway and controlling or eliminating edge beading by disrupting the edge of a molten film by a plurality of vertically spaced internal deckles. In such references as the publication "Modern Converter," only one internal deckle is shown in the melt flow passageway, which does not sufficiently interrupt the edge of the molten film to eliminate edge bead and does not have the sealing ability and advantage of necking down the edge of the molten film as discharged from the die orifice.

The present invention is an improvement on the dies of the foregoing patents, application and publication in that a plurality of internal deckles are provided along the melt flow passageway in vertically spaced relation with respect to each other to more effectively seal the pre-land area of the die along the deckles and to disrupt the edge of the bead of the plastic film to an extent sufficient to eliminate edge build up of the film as extruded from the die. These structures also have no teachings of internal deckles which are vertically spaced and adjustable independently of each other to properly position the deckles in the pre-land area of the melt flow passageway to disrupt the edge of the molten plastic, and adjustable as a unit when once in the proper position, to determine the width of the plastic film.

The die of the present invention, therefore, provides an apparatus particularly adapted for the extrusion of a flat film of thermoplastic materials, such as thermoplastic resins, waxes, hot melt adhesives, etc., in a molten state into a single film that is ready for use, in which edge build up is eliminated by the use of a series of internal deckles in the pre-land area of the die and in which the deckles may be adjustably moved independently of each other to effect offsetting of the ends of the deckles to provide an optimum film with no edge bead.

The deckle structure of the present invention further is an improvement and a distinct advantage over the dies of the foregoing patents, application and publication in that the deckle system may be incorporated in existing die surfaces, with little change in the die and may be in the form of deckle wires positioned along the pre-land area of the die, which may be of various types and sizes, to enable the most effective deckles to be used, to obtain an optimum film with no edge bead.

Another advantage of the invention is that the internal deckles once adjusted in position to give optimum results with no edge bead of the film may be locked in this position and also may be moved in or out along the melt flow passageway for varying widths of film without disrupting the deckles and their sealing ability and their ability to eliminate edge build up of the film extruded through the die.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
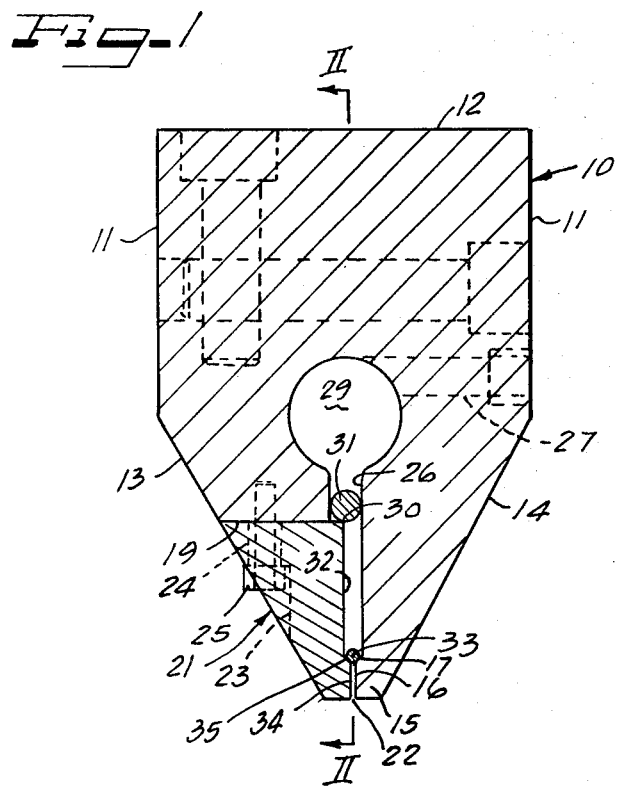
FIG. 1 is a fragmentary transverse generally diagrammatic sectional view taken through a die constructed in accordance with the principles of the present invention.
Figure 2:
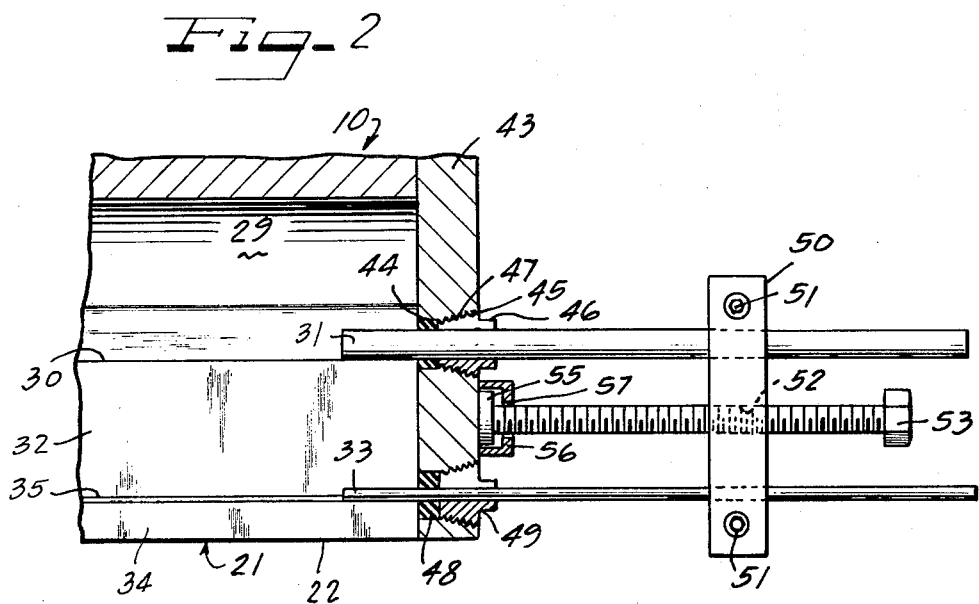
FIG. 2 is a generally longitudinal sectional view taken through the die shown in FIG. 1.

In FIGS. 1 and 2 of the drawings, I have diagrammatically shown a transverse cross section through a die body 10 having parallel side walls 11 and a top wall 12. The side walls 11 extend in vertical and parallel relation with respect to each other for a portion of the length thereof and then converge along converging walls 13 and 14. The lower end of the converging wall 14 forms a die lip 15 having a land wall 16 terminating at its upper end in a shoulder 17, which may extend for the length of the die. The converging wall 13 terminates into a downwardly facing horizontal wall 19 forming an abutment surface for a removable die lip 21, which may be adjustable to vary the area of a die orifice 22. As shown in dotted lines in FIG. 1, the die lip 21 has a series of recessed portions 23 extending therealong terminating in slots 24 for machine screws 25 retaining the die lip 21 to the horizontal wall 19 of the die body 10, and accommodating movement of said die lip inwardly or outwardly to provide a required cross sectional area of the die orifice 22.

The die body 10 also has an inlet passageway 27 leading to a manifold chamber 29 terminating at its lower end into the melt flow passageway 26, and with the manifold chamber being of a generally keyhole-like form. As shown in FIG. 1, the die lip 21 when adjusted with its outer converging wall in alignment with the inclined wall 13, forms a ledge 30 in the melt flow passageway 26, which may form a support for a primary deckle 31. The die lip 21 has a pre-land vertical wall 32 forming one wall of the melt flow passageway 26, shown in FIG. 1 as terminating into a land 34 for an internal deckle 33, forming a wall for the orifice 22 and parallel to the wall 16 of said orifice. Shoulders 35 and 17 extend to the inner margins of the lands 34 and 16, respectively.

In FIG. 2, the die body 10 is shown as having an end plate 43 closing the end of the manifold chamber 29 and forming slidable mountings for the primary and secondary deckles 31 and 33, respectively. While only one end of the die body 10 is shown in FIG. 2, it should be understood that the opposite end of the die body is the same as the end shown and is closed by an end plate 43 forming supports for primary and secondary internal deckles 31 and 33, respectively, like the deckles shown in FIG. 2, and that the deckles at the opposite end of the die body are adjustably moved and held in position in the same manner as the deckles in the end of the die body shown herein.

It should further be understood that while the die body 10 is herein shown as oriented in a vertical direction, with the die orifice leading from the bottom of the die body, that the die body need not be so oriented and may be oriented in any suitable position, particularly where the thermoplastic material is injected under high pressure.

The primary and secondary deckles 31 and 33 are herein shown as being round, with the primary deckle of a larger diameter than the secondary deckle in order that it may perform its sealing function in the preland area of the melt flow passageway. The ledge 30 formed by the inner end of the die lip 21 forms a support for the primary deckle 31 which is sealed to the end plate 43 by a seal 44 of any suitable form and is retained in position in said end plate as by a conical nut 45. The conical nut 45 has an outer squared portion 46 adapted to be engaged by a wrench and the like, and is split longitudinally to be tightened to the deckle as turned in a conical internally threaded hole 47.

In a like manner, the secondary deckle 33 is sealed to the end plate 43 as by the seal 48 and is retained in position as by a conical nut 49 like the conical nut 45 and of the same external diameter as the conical nut 45, so the primary and secondary deckles can be interposed or varied in size, if desired. The hole for the conical nut is also the same diameter as the hole for the conical nut 45 and the hole for the seal 48 is of the same diameter as the hole for the seal 44 to accommodate complete interchangeability of said deckles when required.

The deckles 31 and 33 may be adjustably moved inwardly independently of each other so that one is stepped relative to the other, that is, the deckle 31 may extend farther inwardly from the deckle 33, or the deckle 33 may extend farther inwardly than the deckle 31 in order to properly disrupt the edge of the molten plastic to minimize and reduce edge bead of the film extruded through the orifice 22.

Referring now in particular to the means for moving the primary and secondary deckles inwardly or outwardly along the melt flow passageway, a pair of clamping bars 50 is clamped to the deckles 31 and 33 as by nuts and bolts 51. The clamping bars 50 have registering internally threaded portions 52 threaded on an adjustment bolt 53, disposed midway between the deckles 31 and 33. The adjustment bolt 53 is shown as having a head 55 on its inner end and is retained to the outer wall of the end plate 43 as by a cap 56 having a generally cylindrical internal wall and an apertured outer wall 57, through which extends the adjustment bolt 53. Thus, when it is desired to move the two deckles 31 and 33 inwardly as a unit, the bolt 53 may be turned in a clockwise direction to move the clamping bars 50 toward the end plate 43 for a required width of film. Rotation of the bolt 53 in an opposite direction will move the internal deckles 31 and 33 outwardly relative to said end plate 43.

It is, of course, understood that when adjustably moving the internal deckles together, the split tapered nuts 45 and 49 are loosened to accommodate free inward and outward movement of the internal deckles. Also, when it is desired to adjustably move the internal deckles 31 and 33 relative to each other, the nuts 45 and 49 are loosened and the clamping bars 50 are also loosened from the deckles by loosening the nuts and the bolts 51, to accommodate free inward or outward adjustable movement of the internal deckles 31 and 33 relative to each other.

While the deckles 31 and 33 are shown as being round and may be in the form of corrosion-proof wires, they may preferably be made from stainless steel or other relatively rigid non-corrodible metal. They need not be round, but may be half-round for the portion thereof extending within the pre-land area of the melt flow passageway, or may be of various other forms which will form a proper seal with the walls of the melt flow passageway and effectively disrupt the edge of the flowing film and thereby minimize and eliminate edge bead entirely, in the optimum positions of adjustment of said deckles. The primary deckle rod may also serve as a metering rod in addition to its deckling capabilities.

It should further be understood that the deckles may readily be incorporated in existing dies, with little modification except the provision of holes for the deckles and their seals in the die end plates, and can be used with existing external deckles.

I claim as my invention:

1. In an internal deckle structure for film extruder dies and in combination with a die body having a manifold chamber therein for molten plastic, said die body having an inlet into said chamber and a melt flow passageway leading from said inlet to form a pre-land area terminating into an extrusion orifice, two deckles, each extending transversely through an end of said die body into said pre-land area, said deckles being, relative to the normal direction of melt flow through said pre-land area, longitudinally spaced from one another, said deckles being adapted to sealingly engage internal portions of said die body in said pre-land area and determine in combination with said die body the width of a plastic film extruded from said orifice, and means providing adjustment of said deckles relative to each other to regulate edge portions of said plastic film and minimize edge bead therein.

2. The deckle structure of claim 1, wherein said means providing adjustment also includes releasable clamping means clamping each of said deckles in a chosen position in said pre-land area.

3. In an internal deckle structure for film extruder dies and in combination with a die body having a manifold chamber therein for molten plastic, said die body having an inlet into said chamber and a melt flow passageway leading from said inlet to form a pre-land area terminating into an extrusion orifice, four internal deckles, two extending transversely through each opposite end of said die body into said pre-land area, the deckles in each respective such opposite end being relative to the normal direction of melt flow, longitudinally spaced from one another, said deckles being adapted to sealingly engage internal portions of said die body to seal in said pre-land area and determine in combination with said die body the width of a plastic film extruded from said orifice, and means providing adjustment of said internal deckles relative to each other to regulate edge portions of said plastic film and minimize edge bead therein, said means providing adjustment including releasable clamping means adjusted to clamp each of said deckles in a chosen position in said pre-land area said means providing adjustment further including means for adjustably moving said internal deckles together upon release of said clamping means.

4. The deckle structure of claim 3,
wherein said means providing adjustment enables adjustment of said deckles to effect a maximum disruption of said edge portions to minimize edge bead therein.

5. The deckle structure of claim 4,
wherein said means providing adjustment includes a conical nut for each deckle, each nut being split in a longitudinal direction and adapted to clamp circumferentially its associated deckle upon turning movement of said nut in a tightening direction.

6. The deckle structure of claim 5,
wherein said means providing adjustment includes a motion transmitting member having interengagement with said clamping means, and means retaining said motion transmitting member to said die body to simultaneously adjustably move said deckles in each respective end of said die body inwardly or outwardly at the selection of the operator.

7. The deckle structure of claim 1,
wherein an adjustable die lip forms a portion of said die body and defines said melt flow passageway in combination with said die body and said die lip extends inwardly of said melt flow passageway and further defines a first shoulder transversely extending relative to the normal direction of melt flow, said pre-land area extends downstream relative to the normal direction of melt flow from said shoulder, and a final land is defined at the downstream end of said pre-land area, there being a second shoulder defined in said die body transversely extending relative to the normal direction of melt flow connecting said pre-land area with said final land, and
wherein one of said deckles is adapted to extend along said first shoulder and the other of said deckles is adapted to extend along said second shoulder.

8. The deckle structure of claim 1,
wherein said die body has an end plate forming each of said opposed ends thereof,
wherein said manifold chamber has said melt flow passageway leading therefrom to form in effect a keyhole slot, and an adjustable die lip forms a wall of said melt flow passageway and extends inwardly therefrom to form a shoulder,
wherein two internal deckles extend transversely into said melt flow passageway through each of said end plates, one deckle of which extends along and seals said shoulder formed by said adjustable die lip and the other deckle of which extends along and seals the lower margin of said pre-land area,
and wherein said means providing adjustment cooperate with each of said end plates and include other means adapted for adjusting said deckles inwardly or outwardly transversely of said melt flow passageway and for holding said deckles in prechosen position relative to said end plates.

9. The deckle structure of claim 8,
wherein said means providing adjustment includes split conical nuts threaded in each of said end plates and operable to clamp said deckles in position.

10. The deckle structure of claim 9,
wherein said means providing adjustment includes an adjustment screw having connection means with each of said deckles and adapted for moving said deckles in each of said end plates together or to release said deckles in each of said end plates for relative movement with respect to each other upon release of said conical nuts.

* * * * *